Figure 1:
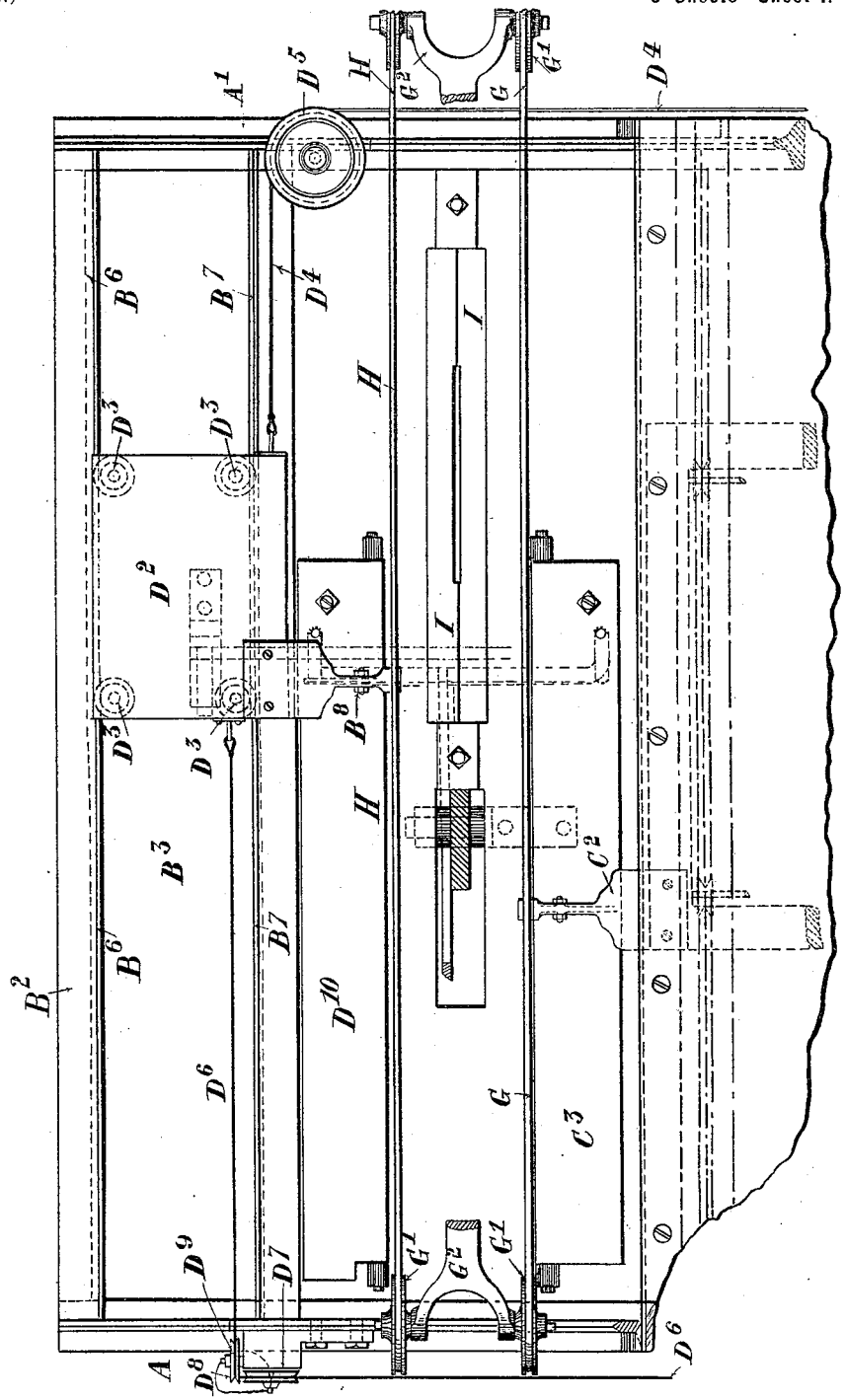

No. 623,473. Patented Apr. 18, 1899.
H. HILL.
READING AND PUNCHING APPARATUS FOR JACQUARDS.
(Application filed Dec. 27, 1897.)
(No Model.) 6 Sheets—Sheet 1.

WITNESSES.
Thomas Durant
J. M. Fowler

INVENTOR
Henry Hill
by Church & Church
his Attys

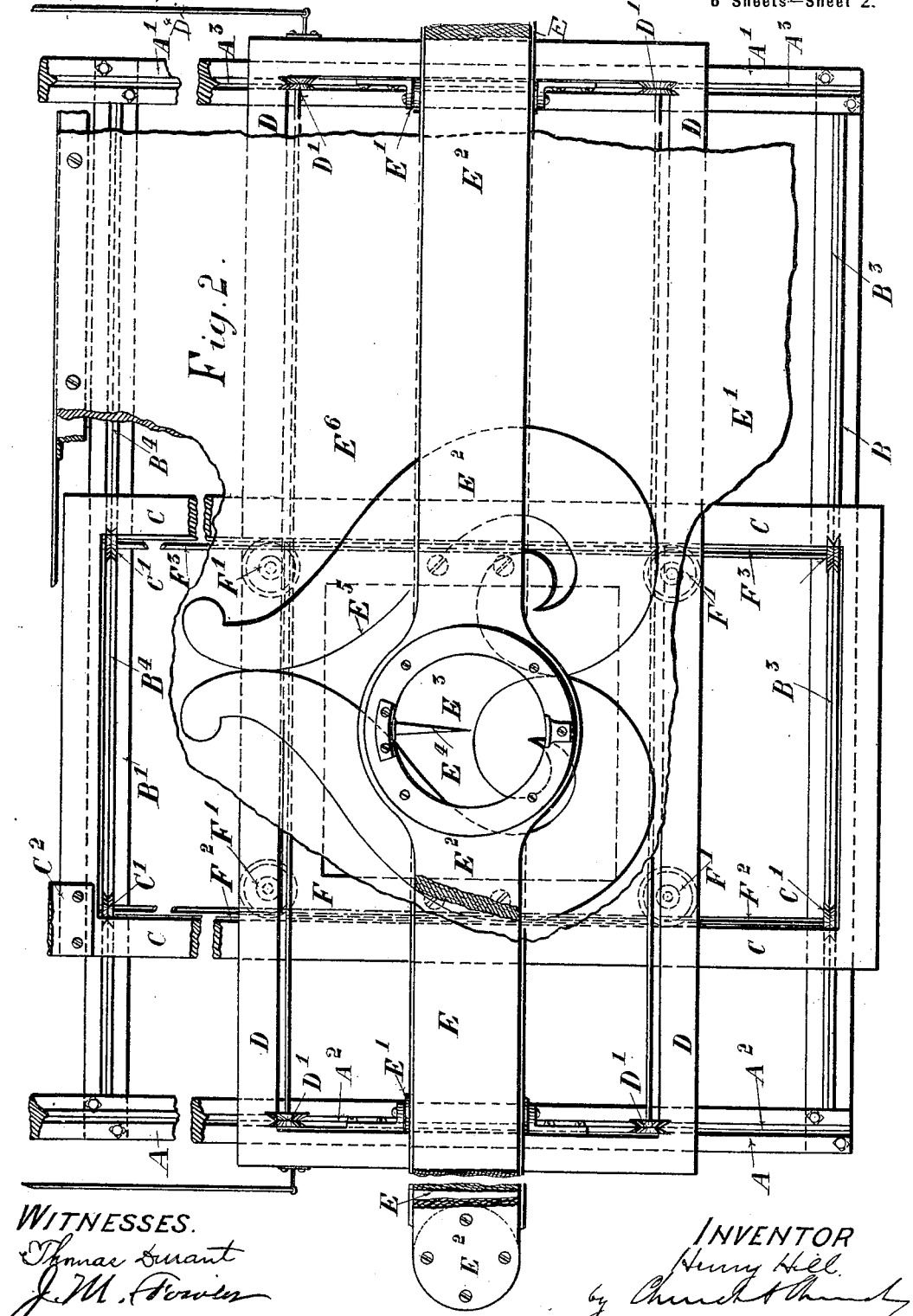

No. 623,473. Patented Apr. 18, 1899.
H. HILL.
READING AND PUNCHING APPARATUS FOR JACQUARDS.
(Application filed Dec. 27, 1897.)
(No Model.) 6 Sheets—Sheet 3.
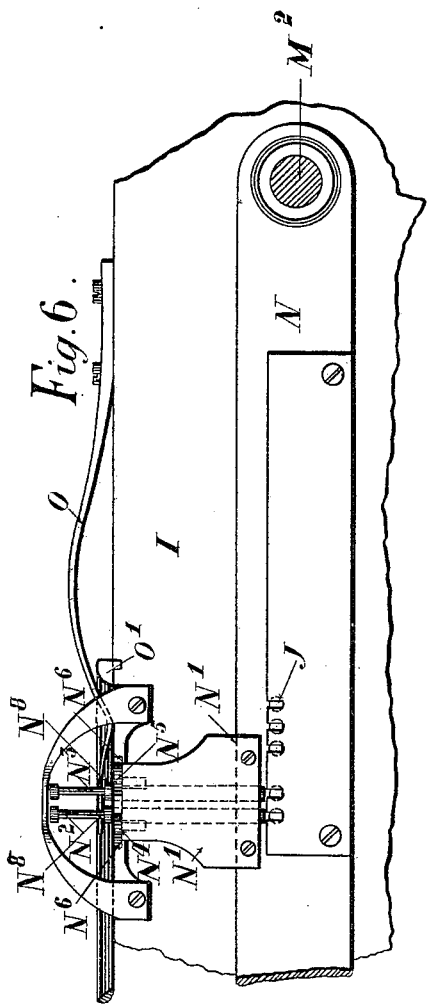
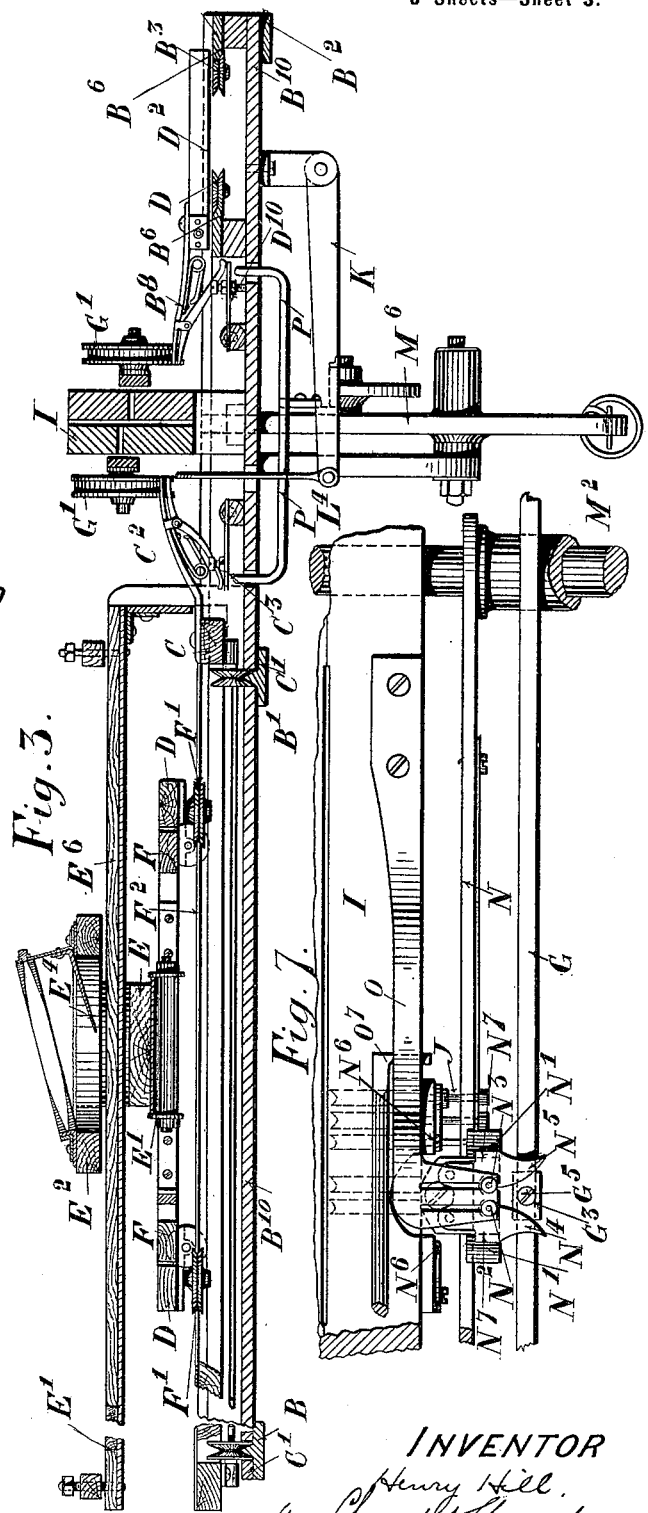
WITNESSES.
INVENTOR
Henry Hill.

No. 623,473. Patented Apr. 18, 1899.
H. HILL.
READING AND PUNCHING APPARATUS FOR JACQUARDS.
(Application filed Dec. 27, 1897.)
(No Model.) 6 Sheets—Sheet 4.

WITNESSES. INVENTOR
Henry Hill,

No. 623,473. Patented Apr. 18, 1899.
H. HILL.
READING AND PUNCHING APPARATUS FOR JACQUARDS.
(Application filed Dec. 27, 1897.)
(No Model.) 6 Sheets—Sheet 5.
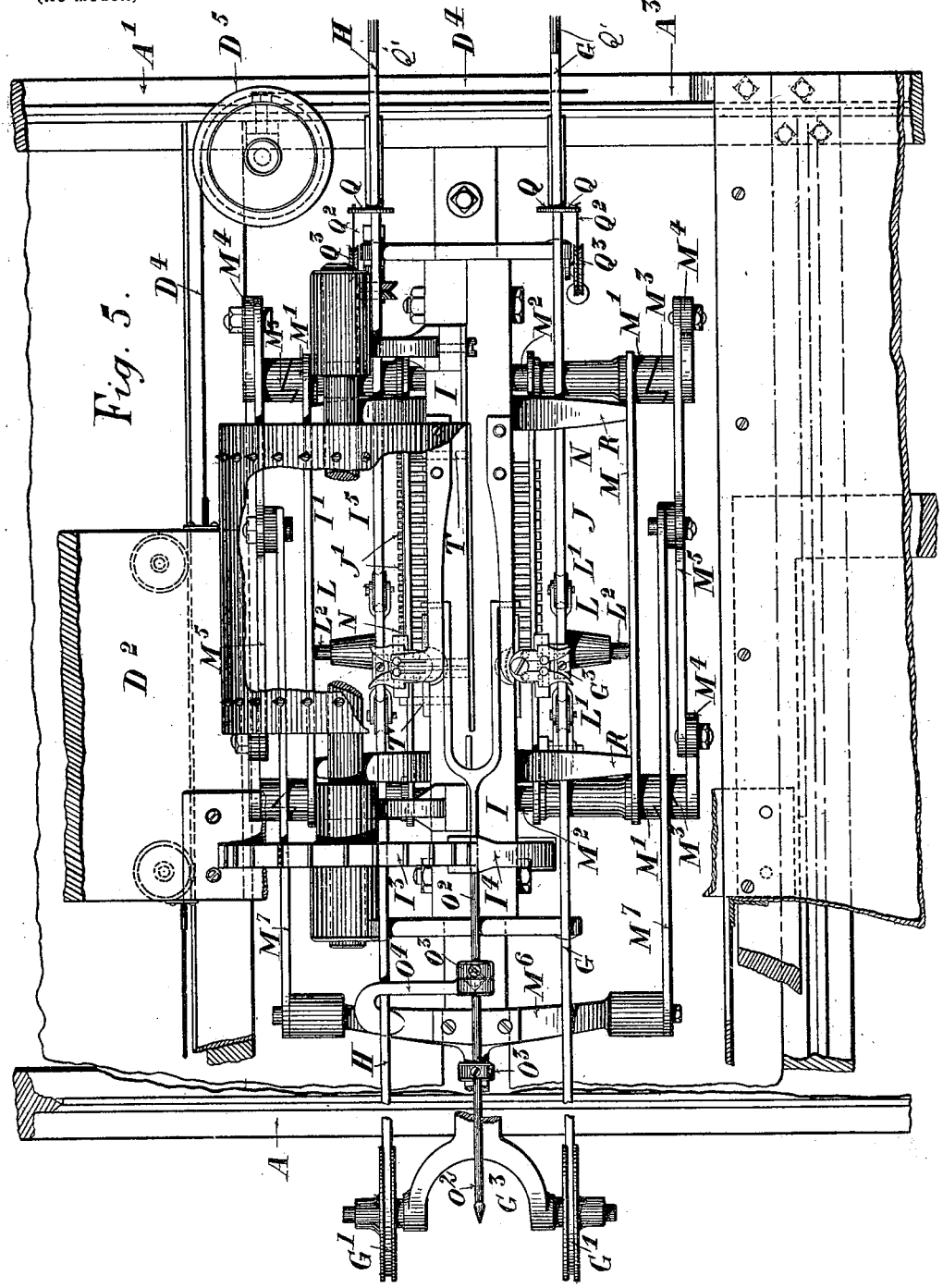
WITNESSES. INVENTOR
Henry Hill.

No. 623,473. Patented Apr. 18, 1899.
H. HILL.
READING AND PUNCHING APPARATUS FOR JACQUARDS.
(Application filed Dec. 27, 1897.)
(No Model.) 6 Sheets—Sheet 6.

WITNESSES.
Thomas Durant
J. M. Fowler

INVENTOR
Henry Hill
by Church & Church
his Attys

THE NORRIS PETERS CO., PHOTO-LITHO., WASHINGTON, D. C.

UNITED STATES PATENT OFFICE.

HENRY HILL, OF NOTTINGHAM, ENGLAND.

READING AND PUNCHING APPARATUS FOR JACQUARDS.

SPECIFICATION forming part of Letters Patent No. 623,473, dated April 18, 1899.

Application filed December 27, 1897. Serial No. 663,622. (No model.)

*To all whom it may concern:*

Be it known that I, HENRY HILL, a subject of the Queen of England, residing at Nottingham, England, have invented a certain new and useful Combined Reading and Punching Apparatus for Embroidering-Machine Jacquards, (for which I have obtained Letters Patent of Great Britain, No. 350, dated January 5, 1897,) of which the following is a specification.

This invention relates to apparatus for simultaneously performing the operations known as "reading" and "punching" pattern-cards or flexible pattern-bands which are to be employed in embroidering-machine jacquards—such, for example, as described in the specification of British Letters Patent No. 2,751, of February 6, 1896, or like jacquards.

The object of the present invention is to provide a mechanical arrangement that will automatically perform the two distinct operations referred to—that is, determine the position of the holes in the pattern cards or band to produce each following stitch in a pattern and simultaneously punch the holes.

By the ordinary method the process of reading or determining the positions of the holes in the pattern cards or band is in the case of each separate stitch or movement a matter of calculation by an expert workman and the punching a subsequent process by the same or another skilled workman. Both processes are extremely tedious and costly in the case of embroidering-machine jacquards and have greatly militated against the application of jacquards to this class of machine. The apparatus comprising the present invention is provided with a pointer, which is intermittently moved along a pattern, each movement being made according to the required length and direction of the corresponding stitch in the said pattern exactly as a pantagrapher follows the design with his pantagraph-pointer. After each movement which automatically determines the position of the holes in the pattern cards or band the said holes are punched, and on the completion of the pattern the cards or band may be placed on a jacquard attached to an embroidering-machine. Each movement of the pointer will then be transmitted by the jacquard governed by the pattern-band to the embroidery-frame of the machine, and the pattern followed by the pointer will be thus produced in embroidery in the machine. It will thus be seen that by means of my apparatus pattern-cards or pattern-bands may be produced with great ease and rapidity and without errors, as the processes are simultaneously performed by mechanical means throughout.

The invention will be best understood by reference to the accompanying drawings, in which—

Figure 4:
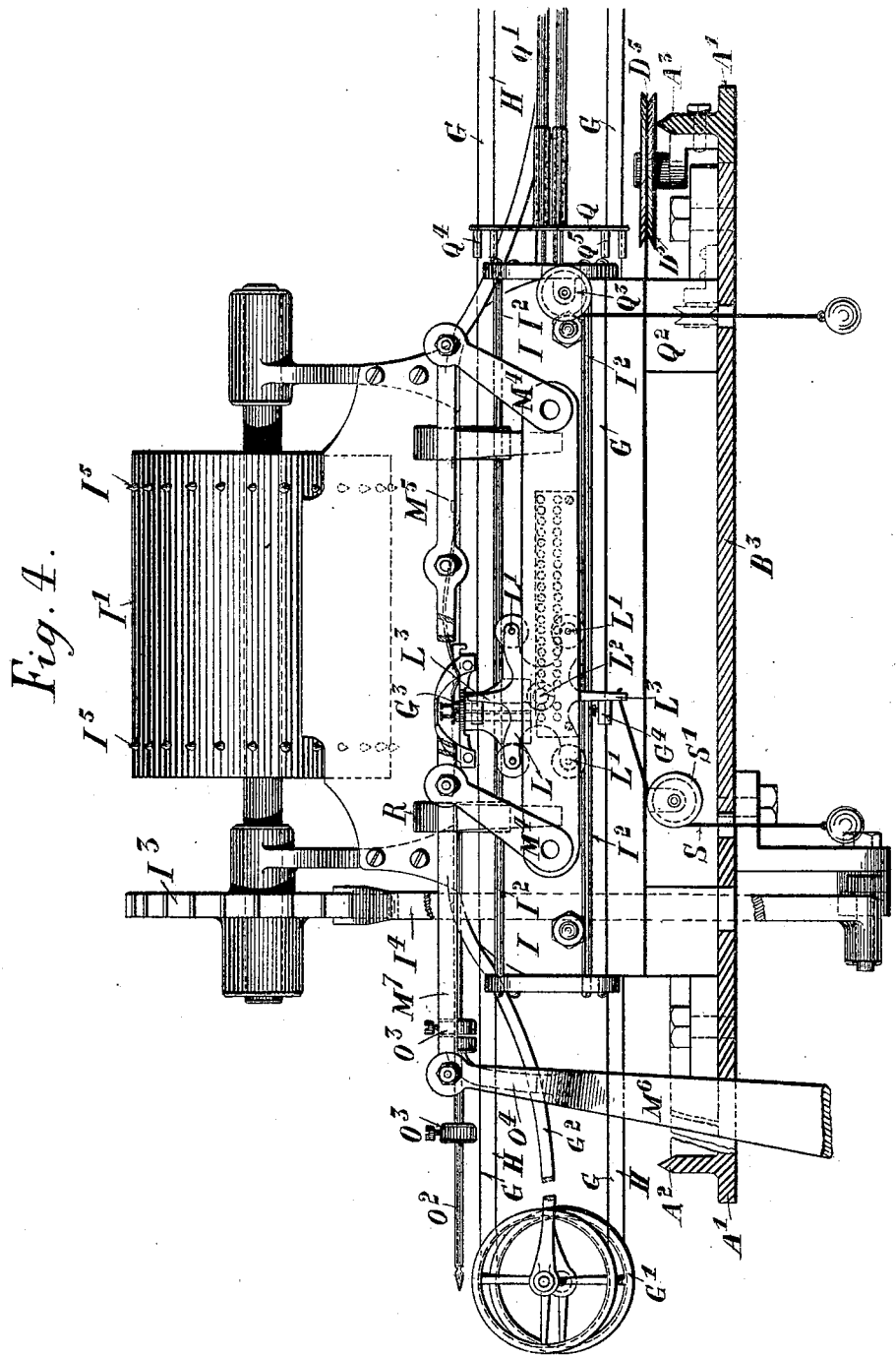
Figure 8:
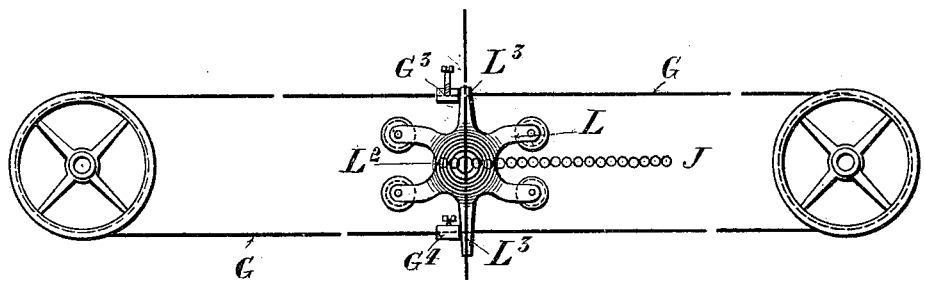
Figure 9:
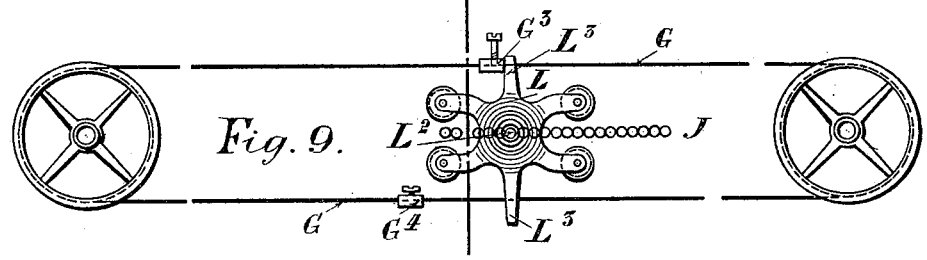
Figure 10:
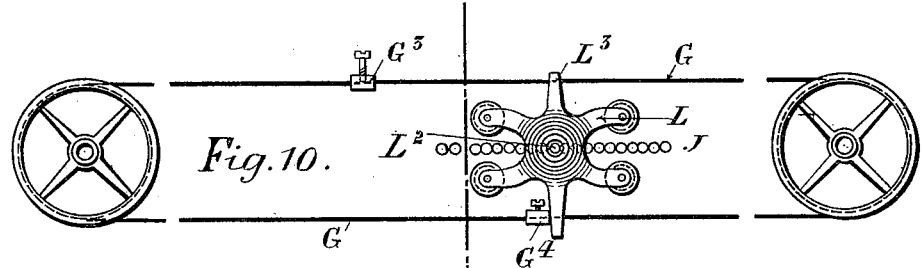
Figure 11:
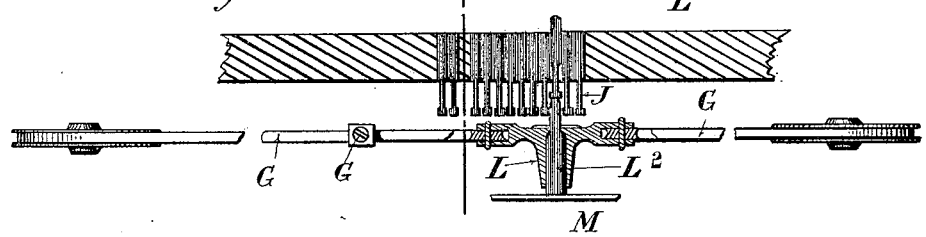

Figure 1 is a plan of one part, and Fig. 2 a plan of the remaining part, of apparatus constructed according to my invention. Fig. 3 is a vertical cross-section of the apparatus. Fig. 4 is an elevation, and Fig. 5 a plan, of the punch-plates, punches, and operating mechanism directly connected therewith. Fig. 6 is an elevation, and Fig. 7 a plan, showing details of the punch-intercepting mechanism of the first two punches in each row. Figs. 8, 9, and 10 are diagrams illustrating the action of the endless bands for moving the selecting-carriages. Fig. 11 is a sectional plan of a punch-plate and carriage.

Like letters indicate like parts throughout the drawings.

The foundation of the apparatus is formed by a fixed rectangular framing comprising two side members A A', (see Figs. 1, 2, and 3,) connected by three transverse members B B' B$^2$. This framing may be mounted on standards or supports at a suitable height and in a horizontal plane, as shown, or, if preferred, sloping from back to front, like an ordinary desk-top. The space between the transverse members B B' B$^2$ may be filled in by a platform B$^{10}$.

Above the fixed framing described is a movable rectangular frame C, provided with grooved wheels C', which run on rails B$^3$ B$^4$ on the transverse members B B', respectively, of the fixed framing. Above the frame C is a second rectangular frame D, provided with grooved wheels D', which run on rails A$^2$ A$^3$ on the side members A A', respectively, of the fixed framing. The frame C will move from left to right or from right to left, while the frame D will only move from back to front or from front to back, the direction of the movement of one frame, C, being precisely at right angles to that of the other, D.

Above the frame D is a transverse parallel bar E. This bar is carried on flanged rollers E', pivoted in or on the frame D. These flanged rollers form a guideway for the bar E and permit said bar to be moved longitudinally without moving the frame D. Secured to the under side of the bar E is a framing F, fitting within the frame C. This framing F is provided with grooved rollers F', which engage with tracks $F^2 F^3$ within the frame C. The framing F may be moved parallel to and within the tracks $F^2 F^3$ without imparting movements to the frame C.

Above the bar E is a board $E^6$, on which the pattern or design is placed, and above the board $E^6$ is a cross bar or frame $E^2$, the two ends of which are connected to the two ends of the parallel bar E. The pattern-board $E^6$ is thus between the bars E $E^2$ and is fixed to the framing, while the bars E $E^2$ move freely below and above it, respectively. The cross-frame $E^2$ is preferably formed with an opening $E^3$, in which is fixed a pointer $E^4$, which the operator moves along the pattern E, which is affixed to the board $E^6$.

The arrangement described works as follows: If the pointer $E^4$ and frame $E^2$ are moved to the right or left, the frame C will be moved in the corresponding direction and to the same extent. If the pointer $E^4$ and framing $E^2$ are moved toward the back or front, the frame D will be likewise moved in the corresponding direction and to the same extent.

In following the outline of a pattern some of the movements of the pointer will be made in a diagonal direction—that is, either toward the right or left, and at the same time toward either the front or back, and both frames C and D will be moved simultaneously. When, however, the pointer is moved in a direction which is precisely parallel to the direction in which either of the frames C or D travels, that frame only will be moved and the other will remain stationary. The result obtained by the arrangement described is as follows: The movements of the frame C represent the horizontal movements and the movements of the frame D the vertical movements to be imparted to the embroidery-frame by the jacquard in order to reproduce the pattern followed by the pointer $E^4$.

I will now describe how the movements of the two frames C and D are to be employed for selecting the punches required to punch the necessary holes in the pattern-band in order to so govern the jacquard that the movements of the said frames C and D are imparted to the single embroidery-frame in the embroidering-machine.

Secured to the frame C is a pair of jaws or nippers $C^2$, (see Figs. 1 and 3,) which are normally closed by a spring. These jaws grip a transverse endless band G, which is carried on two pulleys G', pivoted to brackets $G^2$, secured to the framing. When the frame C is moved, the said movement will be imparted to the band G. The spring-jaws $C^2$ are then opened by a pivoted releasing-bar $C^3$, placed parallel with the band G, and the band is returned, as hereinafter described, to its normal position again.

The frame D is connected to a carriage $D^2$, which is provided with wheels $D^3$, running on rails $B^6 B^7$, secured to the platform $B^3$. This carriage is provided with a pair of spring-jaws $B^8$, which grip a second transverse endless band H, carried also on pulleys G', pivoted to the bracket $G^2$. One side of the frame D is connected to the carriage $D^2$ by a flexible cord $D^4$, passing around a pulley $D^5$, pivoted to the fixed framing. The other side of the frame is connected to the carriage by a flexible cord $D^6$, which passes over a pulley $D^7$ down to a pulley on the weight $D^8$ and up over the pulley $D^9$. The pulleys $D^7 D^9$ are pivoted to the fixed framing or a bracket secured thereto. When the frame D is moved, the said movement will be imparted to the band H and the spring-jaws $B^8$ will then be opened in the same manner as the spring-jaws $C^2$ by a pivoted releasing-bar $D^{10}$.

The punch-plates I are placed between the two endless bands G H, and the pattern band or cards (which latter are previously laced together) are passed through the opening between the two. The bands or cards pass from the punch-plates I (see Figs. 4 and 5) over a drum I', provided with pegs $I^5$ to engage in corresponding holes in the band or cards. The drum I' is intermittently advanced the required distance after each set of holes are punched by a rack-wheel $I^3$, operated by a pawl $I^4$.

The punch-plates I are provided with two rows of punches J J', placed in holes in the said plates corresponding to the position of the needles in the jacquard. As arranged, the upper row of punches J are used exclusively in connection with the horizontal movements of the embroidery-frame, and they are operated from the front, while the lower row J' are used exclusively in connection with the vertical movements of said frame and are operated from the back. It will be seen (see Figs. 4, 8, 9, 10, and 11) that on the left of each row there are two punches, then a gap or space, and then eighteen punches. The number of the latter may be increased or diminished, as required. The two first punches in the upper row J are employed to, say, punch the holes in the band or cards which determine whether the movement of the embroidery-frame is to be to the right or to the left. The remaining punches in the same row are employed to punch the holes which determine the extent of that movement. Other punches may, if desirable, be used for automatically operating other movements of the embroidery-machine. In like manner the first two punches in the lower row J' are employed to, say, punch the hole which determines whether the movement of the embroidery-frame is to be up or down. The remaining punches in the same row are employed to punch the holes which determine the extent of that movement.

The jacquard is so arranged that a hole punched by the punch on the extreme left of the eighteen punches in each row will impart a unit of motion to the embroidery-frame, the next punch on the right two units, and the next three units, and so on up to eighteen units.

The mechanism now to be described for operating the punches in each set is identical, and I will proceed to describe that in connection with the upper row of punches J.

In front of the punch-plates I (see Figs. 4 and 5) is a carriage L, which is provided with wheels L', running on two rails $I^2$, secured to said plates or to the framing. The carriage L travels parallel to the punch-plates and is provided with a plunger or ram $L^2$, which travels in a line with the upper row of punches J. The plunger $L^2$ is moved inward when the carriage is at any point in the length of its traverse by a bar M. This bar is provided at its ends with sleeves M', which are mounted on pins $M^2$, secured to the punch-plates I. The outer ends of the sleeves M' are formed with helical surfaces, which engage with corresponding surfaces on the bosses $M^3$ of the arms $M^4$, which latter are also mounted on the pins $M^2$. By moving the arms $M^4$ about the pins $M^2$ the bar M is forced inward, and the latter simultaneously forces the plunger $L^2$ inward. The inner end of the plunger $L^2$ (see Fig. 11) also engages with the end of the punch to which it is at the time opposite and forces the said punch through the pattern band or card, and this punches the required hole. The punches are withdrawn by a plate N, secured to the sleeves M' of the bar M, and is thus moved with the latter. This plate N is provided with slots, which engage with the heads of the punches.

The arms $M^4$ are connected to each other by a link $M^5$, which latter is connected to a lever $M^6$ by a second link $M^7$. The lever $M^6$ is connected to a foot-lever, (which is not shown,) and this foot-lever is depressed by the foot of the attendant in order to punch the hole. The bars M and N are returned to their normal positions by springs R, secured to the plates I.

When the carriage L is in its normal position or at zero, (in which position it is shown, see Figs. 4, 5, and 8,) its plunger $L^2$ will be in a position which corresponds with the space between the second one of the two first punches and the first one of the following eighteen, and when in this position if depressed the plunger $L^2$ will not engage with a punch, and consequently no hole will be punched.

In order to punch a hole, the carriage L must always be moved from zero to the right whether the frame C be moved to the right or left, and this result I obtain by means of the endless bands G H, hereinbefore referred to. The carriage L is provided with a yoke $L^3$, (see Figs. 4, 8, 9, 10, and 11,) formed with openings, through which the upper and lower parts of the band G pass. On the left of the yoke $L^3$ and on both the upper and lower part of the band G are stops $G^3$ $G^4$, respectively. When the carriage L is at zero, as shown, both stops $G^3$ $G^4$ (see Fig. 8) will engage with the yoke $L^3$, and consequently if the band G be moved in either direction the carriage L will be always moved to the right. For example, if the lower part of the band, which is the part gripped by the spring-jaws $C^2$, is moved to the left, as shown in Fig. 9, the upper stop $G^3$ will move the carriage to the right. If, on the contrary, it be moved to the right, as shown in Fig. 10, the lower stop $G^4$ will move the carriage to the right. It therefore follows that the carriage L will be always moved from zero to the right a distance equal to the movement of the frame C either to the right or left, and the punch, which is depressed by the plunger $L^2$ in the carriage L, is determined by the extent of the movement of the said frame. The punch selected will thus always punch a hole in the pattern band or cards that will reproduce in the jacquard the same number of units of motion as the frame C is moved and communicate the said movement to the embroidery-frame. The carriage L (see Fig. 4) is returned to its normal position or zero after each movement by a weighted cord, S passing over a grooved pulley S'.

The arrangement described for moving the carriage L determines the extent of the horizontal movement only, and whether this movement is to be to the right or to the left is determined by the following arrangement: On the plate N (see Figs. 6 and 7) is a block N', in which are two sliding intercepting pins or bolts $N^2$ $N^3$. These pins are held in their upper or normal position by arms $N^4$ and $N^5$, respectively engaging with collars $N^8$ on each of the said pins. The arms $N^4$ $N^5$ are pivoted on the block N', and their free ends extend beyond the said block and occupy positions on each side, respectively, of a projection $G^5$ on the stop $G^3$, which latter is on the endless band G. If the stop $G^3$ is moved by the band G to the left, the arm $N^4$ will be moved out of engagement with the pins $N^2$ and the latter will fall. If, on the contrary, the stop $G^3$ is moved to the right, the arm $N^5$ will be moved out of engagement with the pin $N^3$, and this latter will fall. When in their lower position, the pins $N^2$ and $N^3$ will engage with the first and second punches respectively, and as the plate N moves inward, as previously described, either of the said punches will be forced inward and punch a hole in the pattern band or card. For example, if the stop $G^3$ be moved to the left the first punch will punch a hole, or if the stop $G^3$ be moved to the right the second punch will punch a hole. As the position of the hole will determine whether the movement of the embroidery-frame is to be to the right or left and the latter is determined by the direction of the movement of the band G, which is in turn moved by the frame C, the direction of the movement of the latter will automatically determine the direction of the movement of the embroidery-frame. The pins $N^2$ $N^3$ are raised into their normal position by a slotted spring O, engaging with the heads of the said pins. This spring is secured to the punch-plate I and is raised by a block O′, sliding between the punch-plates and the spring. The block O′ is connected to a short sliding spindle $O^2$, (see Figs. 4 and 5,) provided with tappets $O^3$, which are operated by an extension $O^4$ of the lever $M^6$, previously described. The arms $N^4$ $N^5$ are returned into engagement with the pins $N^2 N^3$ after the latter are raised by plates $N^6$ on the punch-plates I, engaging with projections $N^7$ on the said arms, as the plate N completes its inward movement. The endless band G is returned into the normal position when released by the jaws $G^2$ by a yoke Q, (see Figs. 4 and 5,) sliding on a pin Q′, secured to the framing. This yoke is operated by a weighted cord $Q^2$, passing over a pulley $Q^3$ and engaging with stops $Q^4$ $Q^5$ on the endless band G.

The lower row of punches J′ are operated by an arrangement which is an exact duplicate of that described and is indicated in the drawings by the same reference-letters. This duplicate arrangement is controlled by the endless band H, previously referred to, the said band being connected to the frame D, as described, and the movements of the said frame are thus reproduced in the jacquard for the up-and-down movement of the embroidery-frame in the same manner as described in reference to the frame C.

The pivoted releasing-bars $C^3$ and $D^{10}$ (see Fig. 3) are both raised by a fork P, which is connected to and is operated by the foot-lever. The pawl $L^4$ is also connected to a lever K, which is operated by the same mechanism.

The operation of the apparatus is as follows: In punching a pattern the operator moves the pointer $E^4$ from point to point or stitch by stitch along the pattern $E^5$, which is fixed on the board $E^6$. Each movement of the pointer moves one or both frames C and D, and the movements of said frames being communicated by the respective endless bands G and H to the carriages L L the latter are removed the required distance from zero. At the same time the movements of the endless bands select one of the two first punches in each set, and the direction of the movements (the extent of which is determined by the distance the carriages move from zero) is thus simultaneously determined. The operator then depresses the foot-lever, and the whole of the required holes are simultaneously punched. This movement releases the bands G H, which return to their normal position. The intercepting-pins $N^2$ $N^3$ are also raised, and either of the arms $N^4$ and $N^5$ which was moved is returned to its normal position again. The operator now raises his foot and the foot-lever rises, the bars M and N retire, and the carriages L L are released and return to their normal position or zero again. The drum I′ is also advanced by the pawl $I^4$, and the cycle of operation is thus completed ready for the next movement of the pointer.

It will be understood that the bands G and H and the whole of the mechanism which they operate return to zero after each set of holes are punched; but the frames C and D, which impart the movements to the said bands G and D, only follow the movements of the pointer $E^4$.

Peg or spacing holes are punched in the pattern band or cards to receive the pegs $I^5$ on the drum I′ and also the pegs on the jacquard drum or cylinder by punches T T, (see Fig. 5,) connected to and reciprocating with the plate N.

I claim—

1. In a reading and punching apparatus for embroidering-machine jacquards, the combination with a framing, of two supplemental frames, one movable back and forth on said framing, and the other from side to side thereof, a fixed pattern-board, a movable pointer-frame, connections between said pointer-frame and supplementary frames whereby the movements of the pointer-frame will be communicated to the supplementary frames, a punch-operating mechanism for punching holes in a pattern band or card and connections between said punch-operating mechanism and supplemental frames; substantially as described.

2. In a reading and punching apparatus for embroidering-machine jacquards, the combination with the framing, of two supplemental frames, one movable back and forth on said framing, and the other from side to side thereof, a fixed pattern-board, a movable pointer-frame, connections between said pointer-frame and supplementary frames, whereby movements of the pointer-frame will be communicated to the supplementary frames, a punch-operating mechanism for punching holes in a pattern card or band connected to the supplementary frames, whereby by a single movement of the pointer, both the extent of the up or down and right and left movements of the embroidery-frames and the direction of such movements may be determined; substantially as described.

3. In a reading and punching apparatus for embroidering-machine jacquards, the combination with a framing of two supplemental frames C and D, the former movable from right to left and the latter back and forth on said framing, the bar E movable longitudinally above the frame D, the framing F fitting within the frame C and movable therein, secured to the under side of the bar E, the pattern-board above the bar E, the cross-bar $E^2$ connected at each end to the parallel bar E and a pointer fixed in an opening in the bar $E^2$ whereby when the pointer is moved, its movements will be communicated to the supplemental frames C and D; substantially as and for the purpose set forth.

4. In reading and punching apparatus for embroidering-machine jacquards the combination with a frame such as C of an endless band G a gripping device such as $C^2$ for connecting said frame and band and a releasing-bar $C^3$ substantially as described.

5. In reading and punching apparatus for embroidering-machine jacquards the combination with a frame D of a carriage $D^2$ connected to the frame D and endless band H a gripping device $B^6$ for connecting the carriage $D^2$ and band H and a releasing-bar $B^{10}$ substantially as described.

6. In reading and punching apparatus for embroidering-machine jacquards the combination with punch-plates such as I and carriage such as L provided with a ram or plunger $L^2$ arranged to move along the row of punches and a reciprocating bar M for depressing the plunger $L^2$ substantially as described.

7. In reading and punching apparatus for embroidering-machine jacquards the combination with a carriage such as L of an endless band H mounted on pulleys and provided with steps $G^3$ $G^4$ on the upper and lower parts which engage with and move the carriage L in one direction whether the band be moved to the right or left substantially as described.

8. In reading and punching apparatus for embroidering-machine jacquards the combination with punch-intercepting pins such as $N^2$ $N^3$ of locking-arms such as $N^4$ $N^5$ and an endless band H provided with a stud which engages with one of the arms $N^4 N^5$ and releases one intercepting-pin according to whether the the band H be moved to the right or left substantially as described.

9. In reading and punching apparatus for embroidering-machine jacquards the combination with a carriage such as L provided with a plunger $L^2$ of a reciprocating bar M a plate N to withdraw the punches and a block N' mounted on the plate N and punch-intercepting pins $N^2 N^3$ mounted in the said block substantially as described.

10. In a reading and punching apparatus for embroidering-machine jacquards, the combination with the punch-plates, having the series of punches, the carriages provided with a ram or plunger for operating said punches, the transverse bar having the sleeves at its ends, mounted on pins secured to the punch-plates the outer ends of said sleeves being formed with helical surfaces, of the arms provided with bosses also mounted on the pins $M^2$ and provided with helical surfaces which engage with the surfaces on the sleeves, whereby when the arms are moved about the pins $M^2$, the bar will be forced inward, and the springs for returning the bar to normal position; substantially as described.

11. In reading and punching apparatus for embroidering-machine jacquards, the combination with punch-plates provided with punches for punching holes in a pattern band or card for determining both the extent of the up or down and right or left movements of the embroidery-frame and also the direction of such movement, of a carriage provided with a ram or plunger which travels along the row of punches a distance proportionate to the extent of the movement required in the embroidery-frame; substantially as described.

12. In a reading and punching apparatus for embroidering-machine jacquards, the combination with the sliding frames, the pointer-frame for moving said sliding frames, the series of punches for punching the pattern band or card, the carriage carrying the ram for operating said punches and mechanism for moving said carriage in one direction irrespective of the movements of the pointer-frame; substantially as described.

13. In a reading and punching apparatus for embroidering-machine jacquards, the combination with the carriages carrying the plunger, of the endless bands provided with stops for engaging with and moving the carriages in one direction irrespective of the movement of the endless bands; substantially as described.

14. In a reading and punching apparatus for embroidering-machine jacquards, the combination with the carriage L, provided with the yoke $L^3$, of the endless band H passing through openings in the yoke, said band being provided with stops on the upper and lower parts adapted to engage with the yoke to move the carriage in one direction, whether the band be moved to the right or left; substantially as described.

15. In a reading and punching apparatus for embroidery-machine jacquards, the combination with the two sets of punch-intercepting pins, of locking-arms for holding the pins of each set inoperative and mechanism for releasing one intercepting-pin of each set, whereby the punches which determine the direction of the movement of the embroidery-frames will be brought into operative position; substantially as described.

16. In a reading and punching apparatus for embroidering-machine jacquards, the combination with the punch-intercepting pins, the locking-arms for said pins, mechanism for releasing one of the locking-arms, and the spring for raising the locking-pins to their normal position; substantially as described.

17. In a reading and punching apparatus for embroidering-machine jacquards, the combination with the punch-plate, carrying the punch, the carriage carrying the plunger, the transverse bar for operating said plunger, to press the punches and the plate provided with slots engaging with the heads of the punches and movable with the bar, whereby when the bar is returned to normal position, the punches will be withdrawn by the plate; substantially as described.

In testimony whereof I have hereto set my hand in the presence of the two subscribing witnesses.

HENRY HILL.

Witnesses:
MARK SHAW,
HUBERT HICKING.